United States Patent
Joedicke

(10) Patent No.: US 7,641,959 B2
(45) Date of Patent: Jan. 5, 2010

(54) ROOFING GRANULES OF ENHANCED SOLAR REFLECTANCE

(75) Inventor: Ingo B. Joedicke, Falling Waters, WV (US)

(73) Assignee: ISP Investments Inc., Wilmington, DE (US)

( * ) Notice: Subject to any disclaimer, the term of this patent is extended or adjusted under 35 U.S.C. 154(b) by 454 days.

(21) Appl. No.: 11/498,564

(22) Filed: Aug. 3, 2006

(65) Prior Publication Data

US 2007/0065641 A1   Mar. 22, 2007

Related U.S. Application Data

(63) Continuation-in-part of application No. 11/329,652, filed on Jan. 11, 2006, now abandoned.

(60) Provisional application No. 60/717,869, filed on Sep. 16, 2005.

(51) Int. Cl.
   B32B 5/16   (2006.01)
   B05D 3/02   (2006.01)
   B05D 7/00   (2006.01)

(52) U.S. Cl. ................ 428/145; 428/143; 428/403; 428/404; 428/323; 427/212; 427/214; 427/379; 427/374.1

(58) Field of Classification Search ............... 428/145, 428/143, 403, 404, 323; 427/214, 379, 374.1, 427/212
See application file for complete search history.

(56) References Cited

U.S. PATENT DOCUMENTS 2,417,058 A * 3/1947 Buzzell et al. ............ 428/145
7,455,899 B2 * 11/2008 Gross et al. ................ 428/145

* cited by examiner

*Primary Examiner*—William P Watkins, III
(74) *Attorney, Agent, or Firm*—Imre Balogh; William J. Davis; Thompson Hine LLP

(57) ABSTRACT

Roofing granules, methods for their preparation, having a Total Solar Reflectance of at least 25% on a substrate or carrier.

14 Claims, 3 Drawing Sheets

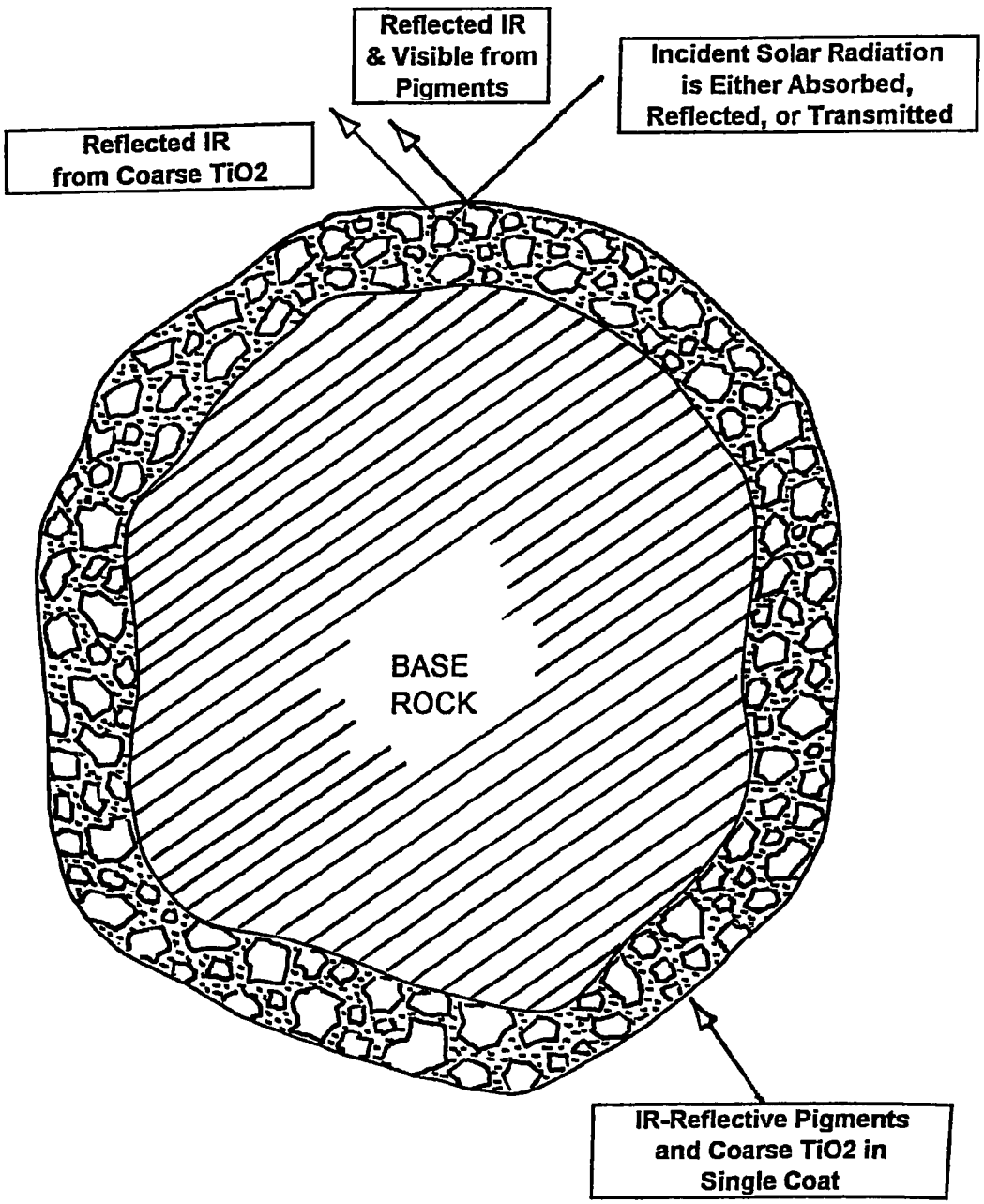

FIGURE B
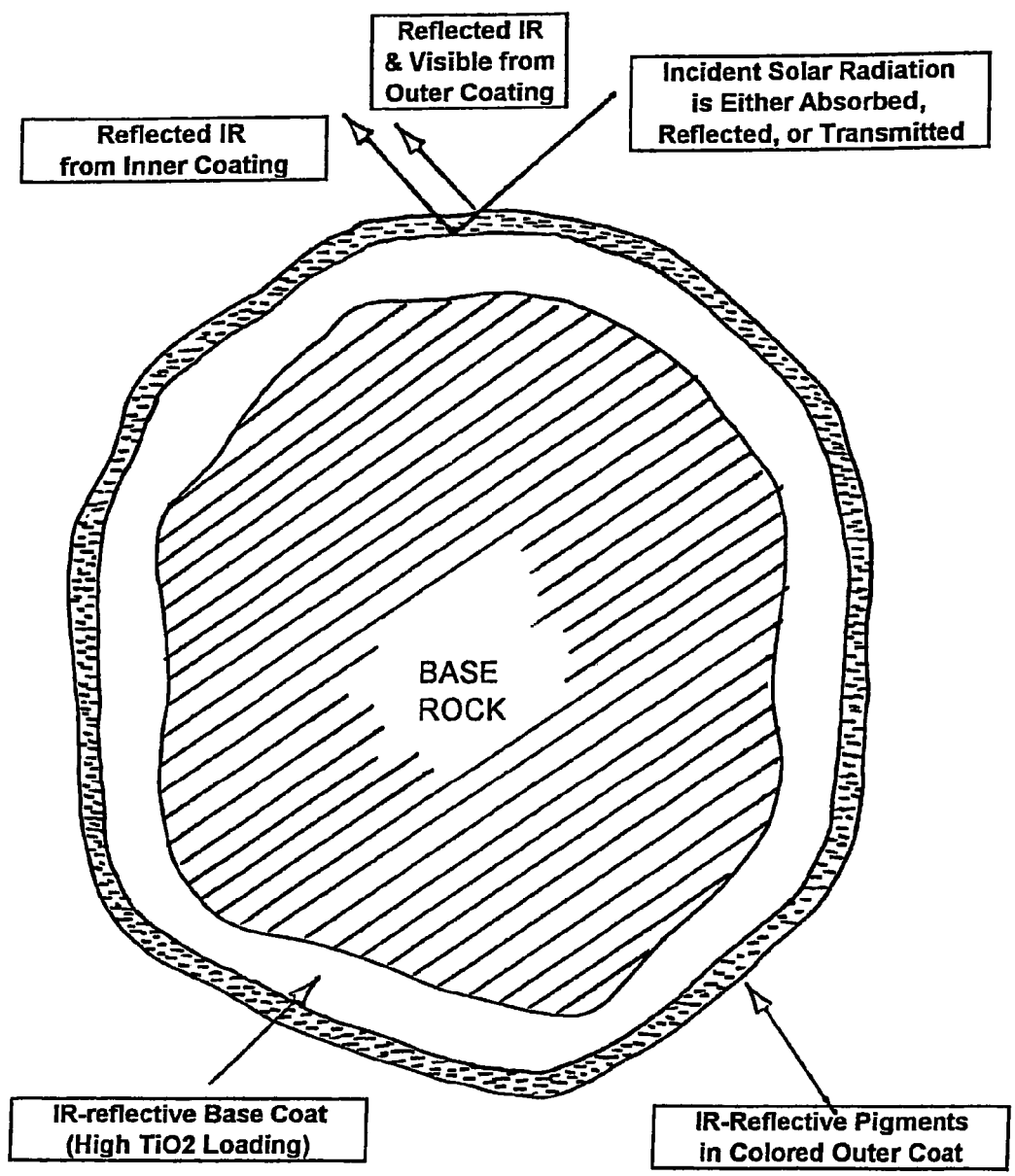

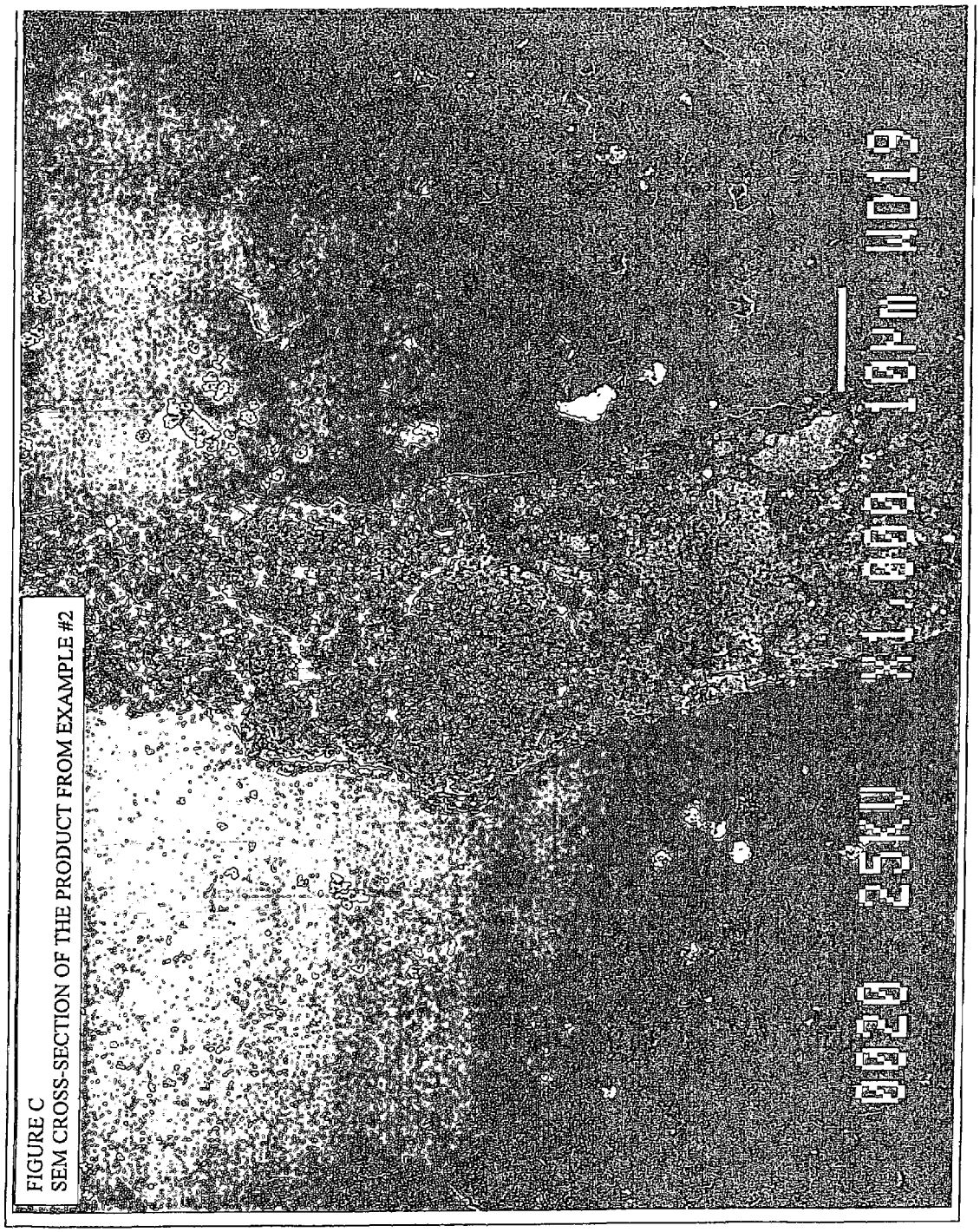
FIGURE C
SEM CROSS-SECTION OF THE PRODUCT FROM EXAMPLE #2

ROOFING GRANULES OF ENHANCED SOLAR REFLECTANCE

CROSS-REFERENCE TO RELATED APPLICATION

This is a continuation-in-part of patent application Ser. No. 11/329,652, filed Jan. 11, 2006 now abandoned which is based on U.S. Provisional application Ser. No. 60/717,869, filed Sep. 16, 2005 incorporated herein by reference.

BACKGROUND OF THE INVENTION

1. Field of the Invention

This invention relates to roofing compositions having enhanced solar reflectance. More particularly, the invention relates to roofing granules having enhanced solar reflectance and to roofing shingles incorporating said granules.

2. Reported Developments

Roofing granules, both natural and artificially color-coated granules, are extensively used in roll roofing and asphalt shingle compositions. The roofing granules are typically embedded in the asphalt coating on the surface of an asphalt-impregnated felt base material, the granules thus forming a coating that provides a weather-resistant exterior roofing surface. In addition to weather-resistance, the color-coated granules also provide an esthetic effect observable with respect to the coating compositions; the appearance of the granules is of major marketing interest (see, for example, U.S. Pat. No. 6,607,781). For this reason, a pigmented color coating is ordinarily applied to the base mineral granules. In addition to pigments, the granule coatings may contain additives such as algaecides to help extend the color and appearance of the roofing material.

In recent years interest in mineral-surfaced roofing of increased solar reflectance has gained momentum as a way to reduce summer cooling costs and to mitigate smog-producing urban "heat island" effects. The EPA Energy Star Initiative requires steep-slope residential roofing to have a minimum Total Solar Reflectance (TSR) of 0.25 (25%). Conformance to this requirement is already possible for many light-colored shingles and blends, but most existing popular dark-colored roofing products have TSR well below 0.25. There is, therefore a great need for dark roofing granules of enhanced solar reflectance that will allow production of residential steep-slope mineral-surfaced roofing products that can meet the EPA Energy Star requirements. Illustrative examples of the prior art follow.

U.S. Publication No. 2005/0074580 relates to a non-white construction surface having reflective coatings for enhancing solar reflectance for use on roofs, such as on asphalt shingles. The method of manufacture is a "bilayer" process, i.e. it involves two distinct coatings: a first coating on the outer surface of a substrate to achieve a direct solar reflectance of at least 25%; and a second coating applied over the first coating to achieve a final TSR of at least 20%. Both coatings use solar reflective materials therein.

U.S. Publication No. 2005/0072114 relates to solar-reflective roofing granules of deep-tone colors formed by coating base mineral particles with a coating composition including an IR-reflective pigment. Color is provided by colored infrared pigments, light-interference platelet pigments, or metal oxides. Both single-coat and bilayer coatings are described.

U.S. Publication No. 2005/0072110 relates to roofing shingles with increased solar heat reflective and a process of making such shingles. The infrared reflective material can be applied to the shingles as a powder in a carrier fluid or a film. Infrared reflective granules can be applied along with the IR-reflective powder.

Simple replacement of existing "hot" pigments, such as Carbon Black and Black Iron Oxide, with new IR-reflective mixed metal oxide pigments during roofing granules manufacture is only partially effective in raising the solar reflective properties of dark roofing granules due to the significant loss of reflectance caused by multiple reflections as a result of the rough granular surfacing of standard asphalt shingles and roll products. Use of the bi-layer or two-coating process in which a highly IR-reflective bright white undercoat is covered by a pigmented overcoat, is effective in enhancing the solar reflectance of roofing granule products. In this two-coat system, IR radiation not reflected or absorbed by the pigmented overcoat is reflected by the undercoat to enhance total IR reflectance. However, this process is very expensive and consumes manufacturing capacity since these roofing granules must be processed twice in order to apply the two coatings. In addition, the resulting product has a very spotty appearance with the bright white undercoat showing through portions of the dark-colored overcoat. The color of such granules would be expected to lighten over time as the outer coat weathers away and more undercoat is exposed. What is needed is an improved process to efficiently and cost-effectively manufacture dark-colored roofing granule products of uniform color, appearance and enhanced solar reflectance.

It is an object of the present invention to produce roofing granules that generally have a minimum of Total Solar Reflectance (TSR) of 0.25 (25%) to meet the EPA Energy Star Initiative. However, roofing granules darker than a Hunter L-value of 25.0 will have a minimum TSR of 0.20 (20%).

It is another object of the present invention to meet the Total Reflectance requirement in non-white colored roofing granule products to satisfy visual appearance requirements.

It is a further object of the present invention to make possible the use of a one coat coloring process system on granule products to minimize the cost of manufacturing.

These and other objects will be addressed as the description of the invention proceeds.

SUMMARY OF THE INVENTION

In one aspect the present invention is directed to the manufacturing of artificially colored roofing granules comprising the steps of:
  a) crushing and sizing a base aggregate to the desired size, typically to No. 11 grading to form granules therefrom;
  b) preheating the granules to 200-240° F.;
  c) preparing a semi-ceramic composition comprising (units in PPT, i.e. pounds per ton of base aggregate):
    Water 40-60
    Sodium Silicate Solution 55 to 100
    ($SiO_2$/$Na_2O$=2.8–3.0, % by wt. solids=35.0–45.0)
    $TiO_2$ (coarse, non-pigmentary) 50 to 150
    IR-Reflective Dark Pigments 0 to 50
    IR-Reflective Tint Pigments 0 to 50
    Kaolin Clay 20 to 30;
  d) combining the components in "c" above with suitable mixing equipment into a coating composition slurry,
  e) applying the slurry to the preheated base aggregate to produce uncured color-coated granules;
  f) pre-drying the individually coated granules to reduce their moisture content to about 0.2%-0.5%;
  g) kiln-firing the granules at temperatures ranging from 500° F. to 1000° F. to form an insolubilized silicate-clay matrix in which the IR-reflective pigments and the coarse titanium dioxide particles are uniformly distributed;

h) cooling the granules to reduce their temperature to 150-250° F.;

i) optionally repeating steps (c) through (h) to adjust both the thickness and composition of the final coating to optimize reflective properties and visual appearance.

j) optionally applying a pickling agent such as 28% $AlCl_3$ or 30% $MgCl_2$ to aid coating insolubilization; and k) treating the granules with a mixture of process oil and an organosilicon compound to impart dust control and to improve asphalt adhesion.

The resulting roofing granules have a thick, uniformly colored coating with coarse non-pigmentary $TiO_2$ and IR-reflective dark and tint pigment particles dispersed throughout the coating matrix as shown in the diagram labeled "FIG. A". Here, the coarse $TiO_2$ particles provide many sites of high reflectance and play the same role as an IR-reflective base coating in the conventional bilayer approach (see FIG. "B") in that the portion of IR radiation that is transmitted through the coating (i.e. not reflected by the pigments) will be reflected by the coarse $TiO_2$.

BRIEF DESCRIPTION OF THE DRAWINGS

FIG. A shows roofing granules colored with coarse non-pigmentary $TiO_2$ and IR-reflective dark and tint pigment particles dispersed throughout the coating matrix.

FIG. B shows the conventional bilayer approach.

FIG. C shows one example of the enhanced reflectivity product of the present invention from scanning Electron Microscope Examination.

DETAILED DESCRIPTION OF THE INVENTION

Roofing granules are extensively used in roll roofing and asphalt shingle products. The roofing granules are generally embedded in the asphalt coating on the surface of the asphalt-impregnated felt base material, the granules thus forming a protective layer to shield the asphalt from the actinic rays of the sun. As this outer granule layer also provides an observable esthetic effect, the appearance of the granules is of major marketing interest. For this reason, a pigmented color coat is typically applied to the base mineral granules to enhance their visual, decorative effect.

Methods for artificial coloring of roofing granules involve crushed and screened minerals in which the granules are coated with a pigment of choice in a silicate/clay matrix. The coating composition contains a soluble alkali silicate binder which is insolubilized by heat treatment or by chemical action or a combination thereof. Insolubilization by chemical action typically involves the addition of an acidic material to the soluble alkali silicate after heat treatment.

It is a main object of the present invention to provide roofing surfaces, such as shingles and roll products, which are covered with granules that have a minimum of Total Solar Reflectance (TSR) of 0.25 (25%).

It is another object of the present invention to meet the Total Solar Reflectance requirement in non-white colored granule products to satisfy visual appearance requirements.

It is a further object of the present invention to make possible the use of a one-step coating system on granule products to minimize the cost of manufacturing and to maximize manufacturing capacity.

The component parts of the process/product of the present invention include:
the substrate or carrier onto which the colored granules are coated;
the coating on the granules and;
treatment conditions of heat and chemical reagents.

The substrate or carrier used in the present invention is well-known in the art and includes an organic asphalt-saturated felt base to receive an outer surface coating thereon.

Granules

Any suitable base raw mineral granules commonly employed, such as greenstone, rhyolite, andesite, basalt, and nephaline syanite, and coal slags can be used in the present invention. An alkali metal silicate-clay coating is applied to the base mineral granules and fired to produce a substantially water-insoluble, pigmented coating on the base mineral granules. However, base mineral granules having high solar reflectance prior to artificial coloring are preferred. Since even the most reflective colored coatings transmit some light to the baserock, where it is either reflected or absorbed, the base reflectance will affect the overall TSR of the finished granules. The preferred base mineral granules have a high silica content of at least 50%. The most preferred base mineral is rhyolite, which not only exhibits high solar reflectance, but also possess the necessary opacity to UV light.

The base material is coated with a semi-ceramic composition consisting of a uniform, homogeneous, fired, silicate-clay matrix comprising:

a) dark IR-reflective (cool) pigments to impart color to the coating and to maximize reflection of the IR portion of incident solar radiation, and b) Coarse, non-pigmentary titanium dioxide particles distributed throughout the coating for the purpose of reflecting transmitted IR radiation not reflected by the pigments.

The dark IR-reflective pigments are present in amounts ranging from 0 PPT to 50 PPT and are generally of mixed metal oxide types that include, but are not limited to, the following generic groups:
Zinc Iron Chromite Brown Spinel
Iron Titanium Brown Spinel
Chromium Green Black Hematite
Chromium Iron Oxide
Chromium Iron Nickel Black Spinel
Cobalt Chromium Green Spinel
Chromium Titanate Green Spinel
Cobalt Aluminate Blue Spinel
Cobalt Chromite Blue-Green Spinel.

Dark IR-reflective pigments representative of these types are available from the Shepherd Color Co., the Ferro Corporation, Engelhard Corporation, and others.

In addition, IR-reflective (cool) and IR-transparent light- and dark-colored metal oxides, commonly used as pigments, may also be employed in amounts ranging from 0 PPT to 50 PPT in conjunction with the IR-reflective dark pigments for purposes of tinting and color adjustments. These include:
Titanium Dioxide White
Chrome Titanate Yellow
Nickel Titanate Yellow
Zinc Ferrite Yellow
Red Iron Oxide
Yellow Iron Oxide
Chrome Oxide Green
Ultramarine Blue
Cobalt Blue.

The coarse titanium dioxide is a non-pigmentary $TiO_2$ commonly used in glass and ceramics manufacture. The particle-size distribution most suitable for purposes of the present invention is:
   100% less than 40 microns (−325 mesh)
   50-100% less than 10 microns
   0-15% less than 1 micron This is used in amounts ranging from 50 PPT to 150 PPT in the coating described in the invention. A non-pigmentary $TiO_2$ suitable for manufacturing the roofing granules of the present invention is KRONOS grade 3025. Optionally, the +325 mesh fraction can be removed from the 3025 to optimize its performance. Also suitable are the enamel grade anatase AT99 from Otavi, and the 1100 grade from Special Materials Corporation (SMC). Both of these materials have a particle size distribution of virtually 100% between 0.5 micron and 10 micron.

Process

The essential steps in the manufacturing process of the roofing granules of the present invention comprises the steps of:
a) crushing and sizing an aggregate (typically No. 11 grading);
b) preheating the crushed and sized aggregate to 200-240° F.;
c) coating the preheated granules with a semi-ceramic composition comprising (in PPT units):
   Water 40-60
   Sodium silicate solution 55 to 100
   ($SiO_2/Na_2O$=2.8-3.0, % by wt. solids=35.0-45.0)
   $TiO_2$ (Coarse) 50 to 150
   IR-reflective dark pigments 0 to 50
   IR-reflective tint pigments 0 to 50
   Kaolin clay 20 to 30.
   These components are combined into a slurry using suitable mixing equipment. The slurry is then applied to the preheated base aggregate in a suitable apparatus to produce uncured color-coated granules;
d) pre-drying the uncured color-coated granules by adjusting the temperature and air flow to reduce their moisture content to between 0.2-0.5%;
e) kiln-firing the uncured granules between 500° F. and 1000° F. to form an insolubilized silicate-clay matrix in which the IR-reflective pigments and coarse titanium dioxide particles are uniformly distributed;
f) cooling the fired, color-coated granules by means of air flow and/or water application in a suitable apparatus to reduce their temperature to 150° F.-250° F.;
g) optionally repeating steps (c) through (f) to adjust both the thickness and composition of the final coating to optimize reflective properties and visual appearance.
h) optionally applying a pickling agent such as 28% aluminum chloride or 30% magnesium chloride solution to aid coating insolubilization; and
i) treating the finished granules with a mixture of process oil and an organosilicon compound to impart dust control and the improve asphalt adhesion.

The basic high-reflectance coating composition and manufacturing process can be used in four (4) different ways to produce an entire product line of roofing granules of enhanced solar reflectance depending primarily upon how dark the target color is:
(1) as a single-coat formulation for the manufacture of medium- to light-colored products
(2) for the darkest colors, as a base coat of a 2-coat process, where both coats are dark, and the $2^{nd}$ coat can be a standard coating
(3) as two successive coatings of the same formulation to prepare intermediate dark products
(4) as the outer coating of a 2-coat process in which a standard base coat is used, e.g. algae-resistant roofing granules that have a cuprous oxide-formulated base coat Product The dark roofing granules of the present invention consist of base mineral aggregate with a thick (15-30 micron) colored coating of significantly enhanced (>0.25) solar reflectance. In contrast, standard dark roofing granules have coatings of typical thickness 5-15 microns and TSR ranging 0.05 to 0.15. The reflectance enhancement is the result of the use of coarse, non-pigmentary $TiO_2$ particles in conjunction with IR-reflective pigments distributed uniformly throughout the alkali silicate/clay matrix (See "FIG. A"). The coarse $TiO_2$ particles have low tint strength and can, therefore, be used at a high loading (e.g. 50-150 PPT) along with the pigments to enhance coating reflectance without significantly affecting coating color. The coarse $TiO_2$ also has only minimal effect on paint viscosity, even at the high loadings employed.

The dark granules of the present invention represent a significant improvement over reflective granules made by the conventional "bilayer" approach (see "FIG. B"). Bilayer reflective products generally exhibit a sharp color contrast between the bright white reflective undercoat and dark-colored IR-reflective overcoat. As a result, such granules typically exhibit a spotty, non-uniform color due to the white undercoat showing through. The color of such granules would also be expected to lighten over time as the outer dark coating weathers away and more undercoat is exposed. In contrast, reflective granules of the present invention have a thick, uniform, homogeneous coating throughout as a result of combining the primary reflectors and pigments within the same coating matrix. Reflectance can be increased in concert with darker color by optionally applying the same coating in multiple steps to produce a progressively thicker coating.

EXAMPLES

The following coating composition (in grams) was prepared in the laboratory using standard mixing equipment.

Example 1

| | |
|---|---|
| Water | 40 |
| Sodium Silicate Grade 40 | 60 |
| Sodium Silicate Grade 50L | 15 |
| Kronos 3025 $TiO_2$ (−325 mesh) | 100 |
| Shepherd 411 IR-Black | 20 |
| Albion Kaolin Clay | 25. |

This coating composition was applied to the equivalent of 2000 gm of Rhyolite baserock of No. 11 Grading that had been preheated to 220° F. Coating application was accomplished by mixing the granules and coating composition in a one-quart jar mounted atop a paint shaker. After thoroughly coating the granules with the composition, a hot air gun was used to dry the coated granules until they were free-flowing. The pre-dried coated granules were then fired through a rotary pilot kiln at 950° F.

The resulting granules were a pleasing dark grey color with a very uniform color coating of excellent coverage. Using a Hunter DP-9000 Color Meter, these granules exhibited a Hunter Color Reading of L=33.8; a=2.1; and b=0.3.

The resulting granules were applied to an asphalt coated aluminum panel to simulate the surface of a standard residential shingle and the Total Solar Reflectance measured using a D&S Reflectometer. A TSR of 0.25 was measured, conforming to Energy Star Steep Slope Requirements.

Example 2

| | |
|---|---|
| Water | 56.5 |
| Silicate K | 68.5 |
| Kronos 3025 TiO$_2$ (−325 mesh) | 120 |
| Chrome Oxide Green | 6.0 |
| Ultramarine Blue | 6.0 |
| Kaolin Clay Slurry | 35.7 |

This coating composition was applied to the equivalent of 2000 gm of Greenstone baserock of No. 11 Grading that had been preheated to 220° F. Coating application was accomplished by mixing the granules and coating composition in a one-quart jar mounted atop a paint shaker. After thoroughly coating the granules with the composition, a hot air gun was used to dry the coated granules until they were free-flowing. The predried coated granules were then fired through a rotary pilot kiln at 950° F.

The resulting granules were grey-green in color with a uniform color coating of excellent (85-90%) coverage. Using a Hunter DP-9000 Color Meter, these granules exhibited a Hunter Color Reading of L=44.9; a=−2.0; and b=2.8, which is very close to ISP's Standard I-116 grey-green roofing granule product manufactured at their Ione, Calif. manufacturing plant.

The resulting granules were applied to an asphalt coated aluminum panel to simulate the surface of a standard residential shingle, and the Total Solar Reflectance measured using a D&S Reflectometer. A TSR of 0.29 was measured, conforming to Energy Star Steep Slope Requirements. A similar panel of the standard I-116 product, of the same visual appearance, exhibited a TSR of only 0.19.

The resulting granules were also suspended in an epoxy matrix and abraded with an abrasive wheel to expose cross-sections of coating for Scanning Electron Microscope Examination. An example of the coating cross-sections for the enhanced reflectance product of this example is shown in attached FIG. C. Baserock is seen on the right and epoxy matrix on the left. The center coating cross-section shown is 20-25 microns thick with coarse TiO$_2$ reflector and pigment components clearly shown.

Example 3

In this example accent-tone granules made by both reflective undercoat and homogeneous coating processes are compared.

The following coating composition (in grams) was prepared in the laboratory using standard mixing equipment:

| | |
|---|---|
| Water | 25 |
| Sodium Silicate Grade 40 | 60 |
| Sodium Silicate Grade 50L | 15 |

-continued

| | |
|---|---|
| TiO$_2$ pigment | 60 |
| Kaolin Clay Slurry | 35.7 |

This coating composition was applied to the equivalent of 2000 gm of Rhyolite baserock of No. 11 Grading and processed/kiln fired in the same manner as that described in the previous example to provide a bright-white reflective undercoat, over which the following outer colored coating was subsequently applied, also using the same paint application method:

| | |
|---|---|
| Water | 18.6 |
| Sodium Silicate Grade 40 | 35.0 |
| Sodium Silicate Grade 50L | 5.0 |
| Shepherd 411 IR Black | 4.0 |
| Chrome Titanate Yellow | 1.0 |
| Chrome Oxide Green | 2.0 |

After kiln-firing at 950° F., the resulting bilayer granules had a reddish-grey color that was very non-uniform (spotty) due to the white undercoat showing through. Overall coverage of the baserock, however, was very good (95+%). These granules exhibited a Hunter Color reading of L=38.5; a=1.1; b=4.5, which is lighter in color than ISP's Standard A-801 accent-tone product. However, the bilayer granules exhibited a TSR of 0.28 as compared to 0.14 for the standard A-801 product.

In comparison, 2000 gm of Rhyolite baserock of No. 11 Grading was coated with the following composition:

| | |
|---|---|
| Water | 50.0 |
| Sodium Silicate Grade 40 | 60.0 |
| Sodium Silicate Grade 50L | 15.0 |
| Kronos 3025 TiO$_2$ (−325) | 120 |
| Chrome Oxide Green | 10.0 |
| Ferro V-10117-25KB IR Brown | 10.0 |
| Kaolin Clay Slurry | 35.7 |

After kiln-firing at 950° F., the single-coat granules were very uniform in color and appearance as a result of the homogenous coating. Overall coating coverage of these granules was also excellent (95+%), their Hunter color was L=35.2; a=1; b=4.1, and their TSR was 0.28. Although the color is still lighter than standard A-801, it is 3.3 points darker than the bilayer product described above while exhibiting the same improvement in reflectance.

As a further extension of the homogeneous coating process, the following composition was applied twice to 2000 gm of Rhyolite baserock in two separate, successive coating applications and firing operations that are consistent with those described in the previous examples:

| | |
|---|---|
| Water | 30.0 |
| Sodium Silicate Grade 40 | 60.0 |
| Sodium Silicate Grade 50L | 15.0 |
| Kronos 3025 TiO$_2$ (−325) | 80.0 |
| Chrome Oxide Green | 20.0 |
| Ferro V-10117-25KB IR Brown | 15.0 |
| Kaolin Clay Slurry | 35.7 |

The resulting granules had a homogenous coating that was only slightly thicker than that applied in the previous single-coat application. Successive coating applications maximize coverage and uniformity and provide a coating that is both darker in color and more reflective. Specifically, this coating exhibited a Hunter color of L=30.9; a=2.2; b=3.6, which is a close match to the color of ISP's Standard A-801 accent-tone product Although significantly darker than the previous experimental accent tone examples, this enhanced homogeneous coating has a TSR equal to 0.28 and is visually indistinguishable from the Standard A-801 with TSR of 0.14.

Example 4

The following coating composition (in grams) was prepared in the laboratory using standard mixing equipment:

| | |
|---|---|
| Water | 50.0 |
| Sodium Silicate Grade 40 | 60.0 |
| Sodium Silicate Grade 50L | 15.0 |
| Kronos 3025 TiO$_2$ (−325) | 120 |
| Shepherd 411 IR Black | 15.0 |
| TiO$_2$ Pigment | 1.0 |
| Chrome Oxide Green | 8.0 |
| Ultramarine Blue | 7.0 |
| Kaolin Clay Slurry | 35.7 |

This coating composition was applied to the equivalent of 2000 gm of Rhyolite baserock of No. 11 Grading and processed/kiln fired in the same manner as that described in the previous examples to provide a gray-colored uniformly coated granules of Hunter Color Reading L=36.7; a=0.2; b=0.6 with a TSR of 0.27. Although more reflective, this experimental product is lighter in color than ISP's Standard A-341 Light Black roofing granules, which typically exhibit a TSR of 0.08.

To further darken the color while maintaining the reflectance enhancement, the following composition was applied twice to 2000 gm of Rhyolite baserock in two separate successive coating applications and firing operations that are consistent with those described in the previous examples:

| | |
|---|---|
| Water | 30.0 |
| Sodium Silicate Grade 40 | 60.0 |
| Sodium Silicate Grade 50L | 15.0 |
| Kronos 3025 TiO$_2$ (−325) | 80.0 |
| Shepherd 411 IR Black | 20.0 |
| Chrome Oxide Green | 10.0 |
| Ultramarine Blue | 10.0 |
| Kaolin Clay Slurry | 35.7 |

The resulting granules had a homogenous coating of dark gray color. Specifically, this coating exhibited a Hunter color of L=32.0; a=0.0; b=0.7. In addition, the twice-coated product showed a TSR of 0.27, thus retaining the reflectance advantage even with the darker coating color.

Example 5

The following coating composition (in grams) was prepared in the laboratory using standard mixing equipment:

| | |
|---|---|
| Water | 56.5 |
| Sodium Silicate K | 68.5 |
| Kronos 3025 TiO$_2$ (−325) | 120 |
| TiO2 Pigment | 40.0 |
| Ultramarine Blue | 4.0 |
| Kaolin Clay Slurry | 35.7 |

This coating composition was applied to the equivalent of 2000 gm of Greenstone baserock of No. 11 Grading and processed/kiln fired as described in the previous examples.

The resulting granules were white in color and uniformly coated. A Hunter Color Reading of L=60.7; a=−1.3; and b=2.1 was obtained, which is very close to ISP's Standard I-720 White roofing granules manufactured at their Ione, Calif. manufacturing plant. Although very similar in appearance to the standard product, the experimental white exhibited a TSR of 0.38, which is significantly higher than the TSR=0.32 typical of I-720.

Example 6

The following reflective coating composition (in grams) was prepared in the laboratory using standard mixing equipment:

| | |
|---|---|
| Water | 50.0 |
| Sodium Silicate Grade 40 | 60.0 |
| Sodium Silicate Grade 50L | 15.0 |
| Otavi AT99 Anatase | 120.0 |
| Shepherd 411 IR Black | 30.0 |
| Kaolin Clay Slurry | 35.7 |

This was applied to the equivalent of 2000 gm of rhyolite base rock of No. 11 grading and processed/kiln fired in the same manner as that described in the previous examples to provide a black, reflective undercoat over which the following even darker second color coating was subsequently applied using the same processing method:

| | |
|---|---|
| Water | 21.5 |
| Sodium Silicate Grade 40 | 35.0 |
| Sodium Silicate Grade 50L | 10.0 |
| Shepherd 411 IR Black | 30.0 |
| Ultramarine Blue | 10.0 |
| Kaolin Clay Slurry | 28.5 |

After kiln-firing at 950 F, the resulting granules were black in color with only a slight brownish undertone. Overall coverage of the baserock was excellent (95+%). These granules exhibited a Hunter color reading of L=21.5; a=2.4; b=0.3, which is slightly lighter than ISP's standard A-340 black product. However, the reflective black granule exhibited a TSR of 0.20 as compared to 0.03 for the standard A-340 product.

Other Examples of Experimental Roofing Granules of Enhanced Reflectance

Using the same basic formulations, processing methods, and kiln firing procedures as those discussed in the previous examples above, several other Standard Roofing Granule Products were converted to Products of Enhanced Solar Reflectance with TSR equal/greater than 0.25. Most of these products were converted without changing their color or appearance. Only the darker products required a lighter color to achieve TSR=0.25 minimum. The darkest product, a reflective counterpart to ISP's standard black roofing granule, has a TSR=0.20 minimum. Table I compares the standard products with their reflective counterparts and shows the increase in Total Solar Reflectance obtained in each case.

TABLE I

PRODUCTS OF ENHANCED TSR COMPARISON WITH STANDARD PRODUCTS

| | STANDARD PRODUCT | | REFLECTIVE COUNTERPART | |
|---|---|---|---|---|
| Product Code | Color | TSR | Color | TSR |
| 116 | Gray-Green | 0.17-0.19 | Same | 0.29 |
| 207 | Terracotta | 0.23 | Same | 0.30 |
| 340 | Black | 0.03 | Lighter | 0.20 |
| 341 | Light Black | 0.08 | Lighter | 0.27-0.30 |
| 546 | Cinnamon | 0.16 | Sl. Lighter | 0.27 |
| 552 | Dark Brown | 0.07 | Lighter | 0.26-0.31 |
| 555 | Tan | 0.22 | Same | 0.27 |
| 556 | Gold | 0.17 | Same | 0.26 |
| 560 | Buff | 0.29 | Same | 0.33-0.38 |
| 707 | Ultra Bright White | 0.49 | Same | 0.52-0.54 |
| 720 | White | 0.32 | Same | 0.37-0.38 |
| 760 | Gray | 0.20-0.22 | Same | 0.30 |
| 801 | Accent Tone | 0.13-0.14 | Same | 0.27-0.28 |

Coating Raw Materials Used in the Examples for Manufacture of Roofing Granules of Enhanced Reflectance Sodium Silicate Binders Sodium Silicate Grade 40 (Occidental Chemicals Corporation) is an aqueous solution containing 38% solids of $SiO_2$/$Na_2O$ weight ratio 3.22.

Sodium Silicate Grade 50 L (Occidental Chemicals Corporation) is an aqueous solution containing 42% solids of $SiO_2$/$Na_2O$ weight ratio 2.00.

Sodium Silicate K (Philadelphia Quartz Company) is an aqueous solution containing 43% solids of $SiO_2$/$Na_2O$ weight ratio 2.88.

Coarse (Non-Pigmentary) Reflective Titanium Dioxide

Kronos 3025 Titanium Dioxide is a non-pigmentary rutile $TiO_2$ designed for Glass and Ceramic manufacturing. Its particle size distribution is 30-40% +400 mesh. To eliminate excessively coarse fractions, a −325 mesh cut is considered optimum.

Otavi AT99 Enamel Grade Anatase has a particle size distribution that is 100% between 0.5 micron and 10 microns with 90% less than 5 microns, about 50% less than 2 microns, and 10% less than 1.0 micron.

Special Materials Corporation (SMC) 1100 is also an Enamel Grade Anatase of particle size distribution very similar to that of the Otavi AT99, Kaolin Clay Slurry Royale AK-1071 (Unimin Corporation) is an aqueous kaolin slurry of 70% solids content. The kaolin component is 85% finer than 2.0 microns with an average particles size of 0.48 microns.

IR-Reflective Pigments

Shepherd 411 (Pigment Brown 29) is a Chromium Iron Oxide of high IR-reflectance. It is used as a black pigment but, due to its strong reddish undertone, is actually a very dark brown.

Ferro V-10117-25KE (Pigment Brown 29) is a dark brown Chromium Iron Hematite of high IR-reflectance.

Other Pigments

Titanium Dioxide White, grade RCL9 from Millenium (SCM Chemicals)

Chrome Titanate Yellow, grade 6R from Heucotech, Ltd.

Chrome Oxide Green, grade 4099 from Elementis Pigments, Inc.

Iron Oxide Red, Grade MPT1200 from Lanxess (Bayer)

Zinc Ferrite Yellow, Grade Bayferrox 950 from Lanxess (Bayer)

Ultramarine Blue, Grade 5016 from Whittaker, Clark & Daniels.

What is claimed is:

1. Colored granules comprising:
   a) a base material of crushed and sized mineral aggregates in the form of granules; and
   b) an insolubilized coating material covering said granules comprising:
      (i) dark IR-reflective pigments; and
      (ii) coarse non-pigmentary titanium dioxide of particle size distribution:
         100% less than 40 microns (−325 mesh)
         50-100% less than 10 microns
         0-15% less than 1 micron;
      wherein said coarse, non-pigmentary titanium dioxide is present in amounts of 50 PPT to 150 PPT, for each layer of coating applied; and
      wherein when said colored granules have a Hunter Lightness L>/=25.0, the colored granules have a Total Solar Reflectance of at least 25% and when said colored granules have a Hunter Lightness L<25.0, the colored granules have a Total Solar Reflectance of at least 20%.

2. The colored granules of claim 1 wherein said base material is selected from a group consisting of greenstone, rhyolite, andesite, basalt, nephaline syanite and coal slags.

3. The colored granules of claim 1 wherein said IR-reflective pigment comprises at least one pigment selected from the group consisting of zinc iron chromite spinel, iron titanium brown spinel, chromium green-black hematite, chromium iron oxide, chromium iron nickel black spinel, cobalt chromium green spinel, chromium titanate green spinel, cobalt aluminate blue spinel, and cobalt chromite blue-green spinel.

4. The colored granules of claim 3 wherein said dark IR-reflective pigments are present in amounts of up to 50 PPT, for each layer of coating applied.

5. The colored granules of claim 1 wherein said coating comprises up to about 50 PPT (for each layer of coating applied) of at least one metal oxide pigment selected from the group consisting of titanium dioxide white, chrome titanate yellow, nickel titanate yellow, zinc ferrite yellow, red iron oxide, yellow iron oxide, chrome oxide green, ultramarine blue, and cobalt blue.

6. A method of preparing colored granules comprising the steps of:
   a) crushing and sizing a mineral aggregate;
   b) preheating the crushed and sized aggregate to about 210-230° F.;
   c) coating the preheated granules in one or multiple applications, with a semi-ceramic composition comprising in PPT units:
      40-60 water
      55 to 100 sodium silicate solution ($SiO_2/Na_2O=2.8$-3.0, % by wt. solids 35.0-40.0)
      50 to 150 coarse $TiO_2$
      0 to 50 IR-reflective dark pigments
      0 to 50 IR-reflective tint pigments
      20 to 30 Kaolin clay,
   d) combining the components in (c) above with suitable mixing equipment into a coating composition slurry
   e) applying the slurry to the preheated base aggregate to produce uncured color-coated granules
   f) pre-drying the uncured color-coated granules by adjusting the temperature and air flow to reduce their moisture content to about 0.2-0.50%;
   g) kiln-firing the uncured granules at 500° F. to 1000° F. to form an insolubilized silicate-clay matrix in which the IR-reflective pigments and coarse titanium dioxide particles are uniformly distributed;
   h) cooling the fired, color-coated granules by means of air flow and/or water application to reduce their temperature to about 200° F.-220° F.;
   i) optionally repeating steps (c) through (h) to adjust the thickness and composition of the final coating to optimize reflective properties and visual appearance
   j) optionally applying a pickling agent to aid coating insolubilization; and
   k) treating the finished granules with a mixture of process oil and an organosilicon compound to impart dust control to improve asphalt adhesion,
      wherein when said colored granules have a Hunter Lightness L>/=25.0, the colored granules have a Total Solar Reflectance of at least 25% and when said colored granules have a Hunter Lightness L<25.0, the colored granules have a Total Solar Reflectance of at least 20%.

7. The method of claim 6 wherein said base material is selected from the group consisting of greenstone, rhyolite, andesite, basalt, nephaline syanite and coal slags.

8. The method of claim 6 wherein said semi-ceramic composition comprises at least one IR-reflective dark pigment selected from the group consisting of zinc iron chromite spinel, iron titanium brown spinel, chromium green-black hematite, chromium iron oxide, chromium iron nickel black spinel, cobalt chromium green spinel, chromium titanate green spinel, cobalt aluminate blue spinel, and cobalt chromite blue-green spinel.

9. Roofing shingles comprising a substrate and the colored granules of claim 1 embedded or coated onto said substrate wherein said colored granules comprise at least one dark IR-reflective pigment selected from the group consisting of: zinc iron chromite spinel, iron titanium brown spinel, chromium green-black hematite, chromium iron oxide, chromium iron nickel black spinel, cobalt chromium green spinel, chromium titanate green spinel, cobalt aluminate blue spinel, and cobalt chromite blue-green spinel wherein said roofing shingles have a Total Solar Reflectance of at least 25%.

10. Colored granules comprising:
   a) a base material of crushed and sized mineral aggregates in the form of granules; and
   b) an insolubilized coating material covering said granules comprising:
      (i) dark IR-reflective pigments; and
      (ii) coarse non-pigmentary titanium dioxide of particle size distribution:
         100% less than 40 microns (-325 mesh)
         50-100% less than 10 microns
         0-15% less than 1 micron;
      wherein said coarse, non-pigmentary titanium dioxide is present in amounts of 50 PPT to 150 PPT, for each layer of coating applied.

11. Colored granules comprising:
   a) a base material of crushed and sized mineral aggregates in the form of granules; and
   b) an insolubilized coating material covering said granules comprising:
      (i) dark IR-reflective pigments; and
      (ii) coarse non-pigmentary titanium dioxide of particle size distribution:
         100% less than 40 microns (-325 mesh)
         50-100% less than 10 microns
         0-15% less than 1 micron;
      wherein said coarse, non-pigmentary titanium dioxide is present in amounts of 50 PPT to 150 PPT, for each layer of coating applied; and
      wherein when said colored granules have a Hunter Lightness L>/=25.0, the colored granules have a Total Solar Reflectance of at least 25% and when said colored granules have a Hunter Lightness L<25.0, the colored granules have a Total Solar Reflectance of at least 20%.

12. The colored granules of claim 11 wherein said base material is selected from a group consisting of greenstone, rhyolite, andesite, basalt, nephaline syanite and coal slags.

13. The colored granules of claim 11 wherein said dark IR-reflective pigment comprises at least one pigment selected from the group consisting of zinc iron chromite spinel, iron titanium brown spinel, chromium green-black hematite, chromium iron oxide, chromium iron nickel black spinel, cobalt chromium green spinel, chromium titanate green spinel, cobalt aluminate blue spinel, and cobalt chromite blue-green spinel.

14. The colored granules of claim 11 further comprising at least one pigment selected from the group consisting of titanium dioxide white, chrome titanate yellow, nickel titanate yellow, zinc ferrite yellow, red iron oxide, yellow iron oxide, chrome oxide green, ultramarine blue, and cobalt blue.

* * * * *